US009358911B2

(12) United States Patent
Brncick et al.

(10) Patent No.: US 9,358,911 B2
(45) Date of Patent: Jun. 7, 2016

(54) CONTROLLABLE COMFORT SHELL FOR VEHICLE SEAT

(71) Applicant: Faurecia Automotive Seating, LLC, Troy, MI (US)

(72) Inventors: Gregory Brncick, Holland, MI (US); Dana J. Lowell, Holland, MI (US); Adam Mack, Menlo Park, CA (US); Timothy R. Proulx, Nashua, NH (US)

(73) Assignee: Faurecia Automotive Seating, LLC, Troy, MI (US)

(*) Notice: Subject to any disclaimer, the term of this patent is extended or adjusted under 35 U.S.C. 154(b) by 68 days.

(21) Appl. No.: 14/511,998

(22) Filed: Oct. 10, 2014

(65) Prior Publication Data

US 2015/0021966 A1 Jan. 22, 2015

Related U.S. Application Data

(62) Division of application No. 12/951,955, filed on Nov. 22, 2010, now Pat. No. 8,857,908.

(60) Provisional application No. 61/263,642, filed on Nov. 23, 2009.

(51) Int. Cl.
| *B60N 2/66* | (2006.01) |
| *B60N 2/68* | (2006.01) |
| *B60N 2/22* | (2006.01) |
| *B60N 2/64* | (2006.01) |
| *B60N 2/02* | (2006.01) |

(52) U.S. Cl.
CPC ............. *B60N 2/643* (2013.01); *B60N 2/0232* (2013.01); *B60N 2/2231* (2013.01); *B60N 2/66* (2013.01); *B60N 2/68* (2013.01)

(58) Field of Classification Search
CPC ........ B60N 2/643; B60N 2/0232; B60N 2/66; B60N 2/68; B60N 2/2231
See application file for complete search history.

(56) References Cited

U.S. PATENT DOCUMENTS

| 2,843,195 A | 7/1958 | Barvaeis |
| 3,973,797 A | 8/1976 | Obermeier et al. |
| 4,316,631 A | 2/1982 | Lenz et al. |
| 4,390,210 A | 6/1983 | Wisniewski et al. |
| 4,465,317 A | 8/1984 | Schwarz |
| 4,541,670 A | 9/1985 | Morgenstern et al. |
| 4,565,406 A | 1/1986 | Suzuki |
| 4,601,514 A | 7/1986 | Meiller |

(Continued)

FOREIGN PATENT DOCUMENTS

| DE | 4121768 | 10/1992 |
| DE | 102005054125 | 5/2007 |

(Continued)

OTHER PUBLICATIONS

European Search Report for application No. EP 10 01 4831, dated Feb. 24, 2011, 4 pages.

(Continued)

*Primary Examiner* — Timothy J Brindley
(74) *Attorney, Agent, or Firm* — Reising Ethington P.C.

(57) ABSTRACT

A vehicle seat includes a seat back having a backrest, a backrest support, and a linkage arranged to interconnect the backrest and the backrest support. The linkage is configured to support the backrest for movement relative to the backrest support.

9 Claims, 7 Drawing Sheets

(56) References Cited

U.S. PATENT DOCUMENTS

| | | |
|---|---|---|
| 4,730,871 A | 3/1988 | Sheldon |
| 5,026,116 A | 6/1991 | Dal Monte |
| 5,249,839 A | 10/1993 | Faiks et al. |
| 5,344,211 A | 9/1994 | Adat et al. |
| 5,403,069 A | 4/1995 | Inara et al. |
| 5,423,593 A | 6/1995 | Nagashima |
| 5,452,868 A | 9/1995 | Kanigowski |
| 5,505,520 A | 4/1996 | Frusti et al. |
| 5,558,398 A | 9/1996 | Santos |
| 5,567,010 A | 10/1996 | Sparks |
| 5,567,011 A | 10/1996 | Sessini |
| 5,772,281 A | 6/1998 | Massara |
| 5,871,258 A | 2/1999 | Battey et al. |
| 5,975,634 A | 11/1999 | Knoblock et al. |
| 6,211,227 B1 | 4/2001 | Yoshida et al. |
| 6,367,877 B1 | 4/2002 | Knoblock et al. |
| 6,378,942 B1 | 4/2002 | Chu |
| 6,382,719 B1 | 5/2002 | Heidmann et al. |
| 6,394,545 B2 | 5/2002 | Knoblock et al. |
| 6,398,299 B1 | 6/2002 | Angerer et al. |
| 6,460,928 B2 | 10/2002 | Knoblock et al. |
| 6,520,577 B2 | 2/2003 | Kitagawa |
| 6,637,817 B1 | 10/2003 | Christopher et al. |
| 6,779,844 B2 | 8/2004 | Dosen et al. |
| 7,021,706 B2 | 4/2006 | Aufrere et al. |
| 7,040,709 B2 | 5/2006 | Knoblock et al. |
| 7,131,700 B2 | 11/2006 | Knoblock et al. |
| 7,216,933 B2 | 5/2007 | Schmidt et al. |
| 7,237,847 B2 | 7/2007 | Hancock et al. |
| 7,239,096 B2 | 7/2007 | Hancock et al. |
| 7,481,493 B2 | 1/2009 | Fujita et al. |
| 7,611,199 B2 | 11/2009 | Michalak et al. |
| 2003/0085600 A1 | 5/2003 | Mori |
| 2007/0132289 A1 | 6/2007 | Phipps |
| 2008/0079298 A1 | 4/2008 | Whelan et al. |

FOREIGN PATENT DOCUMENTS

| | | |
|---|---|---|
| EP | 1316651 | 6/2003 |
| WO | 03068557 | 8/2003 |
| WO | 2005047057 | 5/2005 |

OTHER PUBLICATIONS

Frost et al., "Development of Human Back Contours for Automobile Seat Design," Society of Automotive Engineers, 1997, 9 pages.

Hubbard et al., "Biomechanically Articulated Chair Concept and Prototypes," Society of Automotive Engineers, 1997, 8 pages.

Steelcase Website at http://www.steelcase.co.uk/en/products/category/seating/task/leap/pagesioverview.aspx, Leap, 1 page.

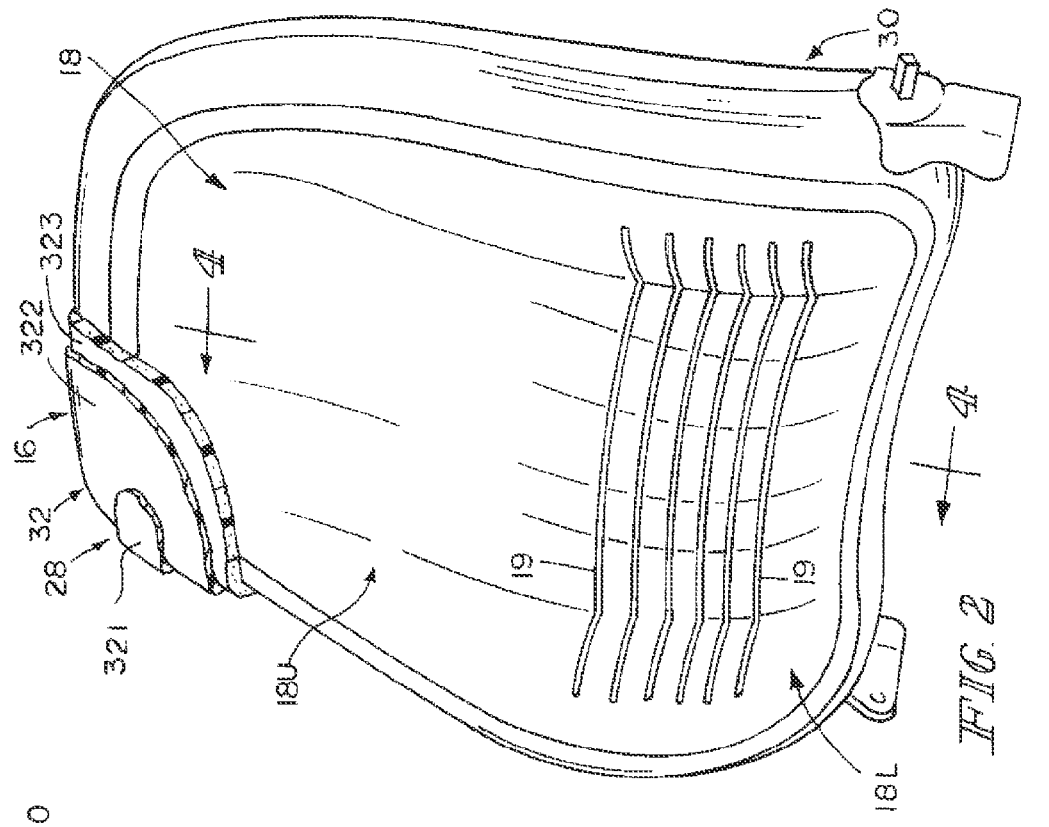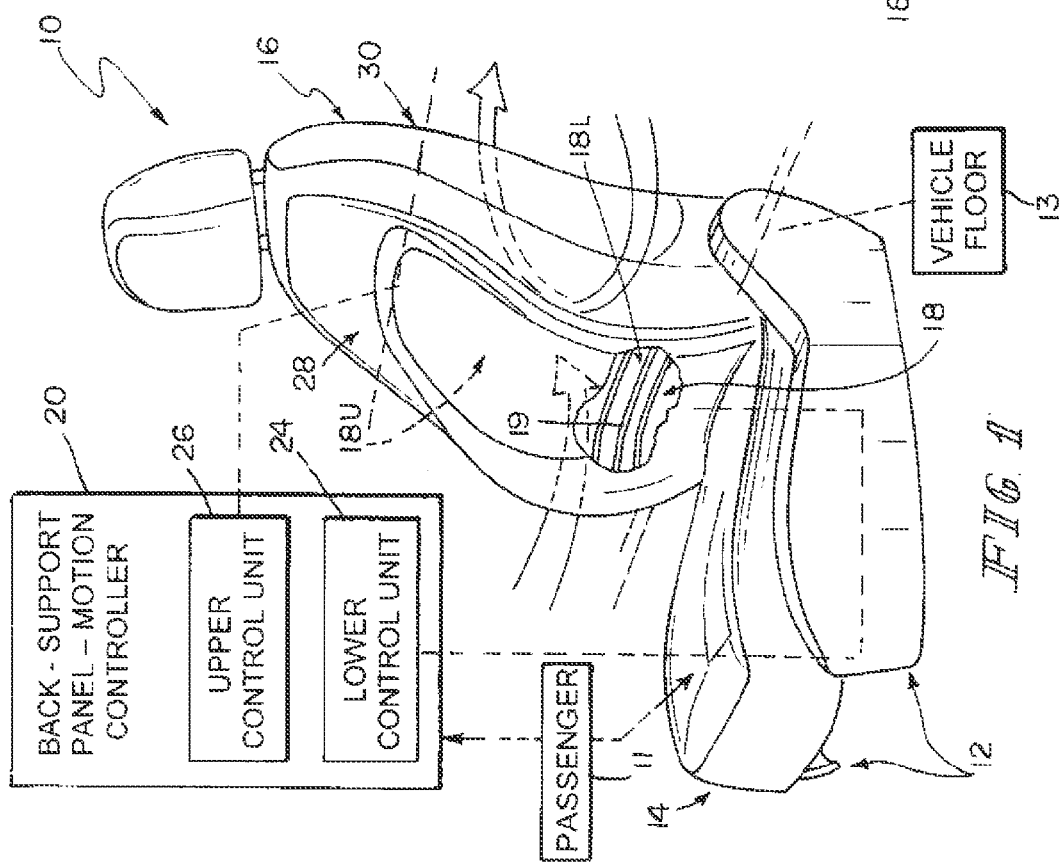

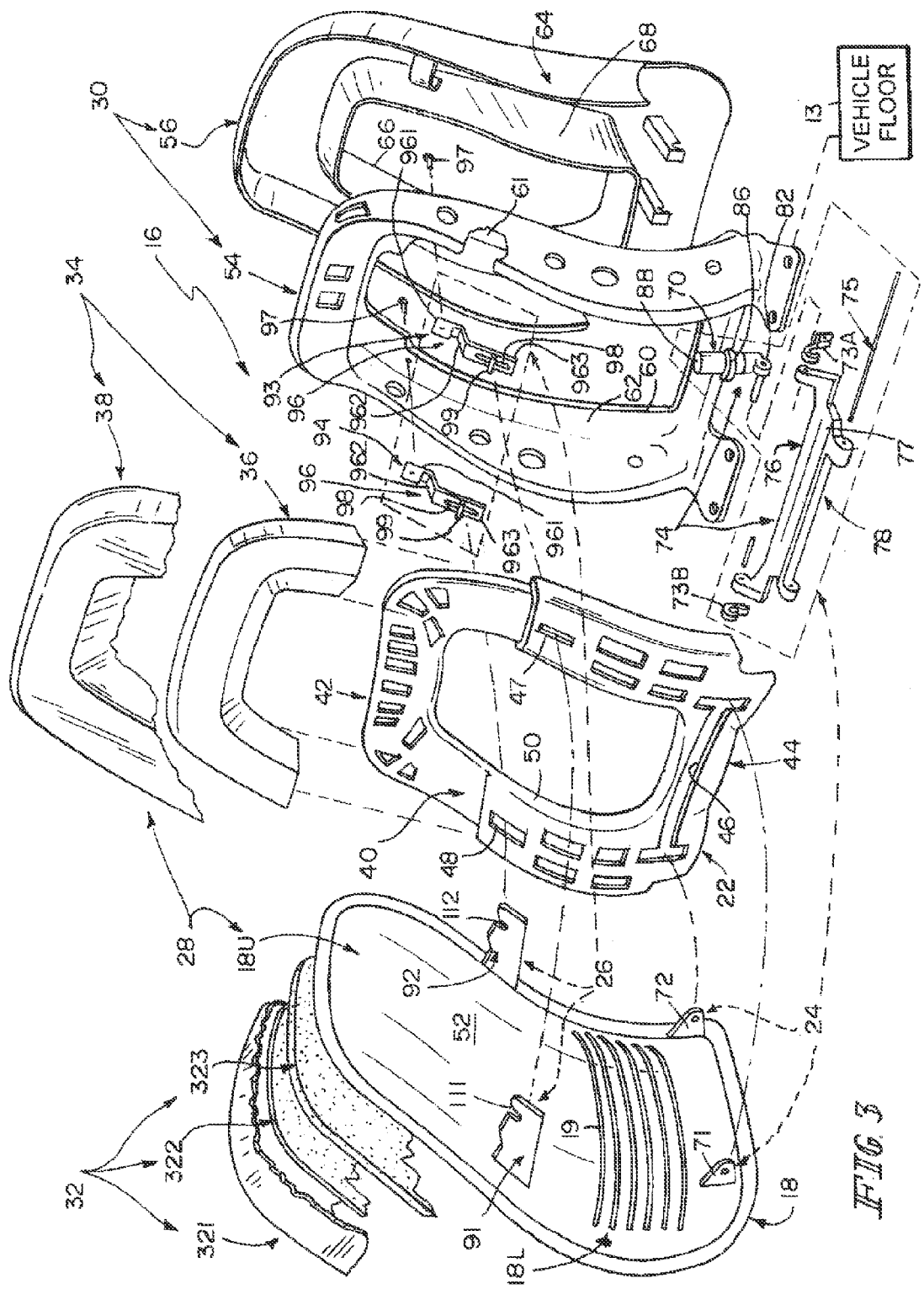

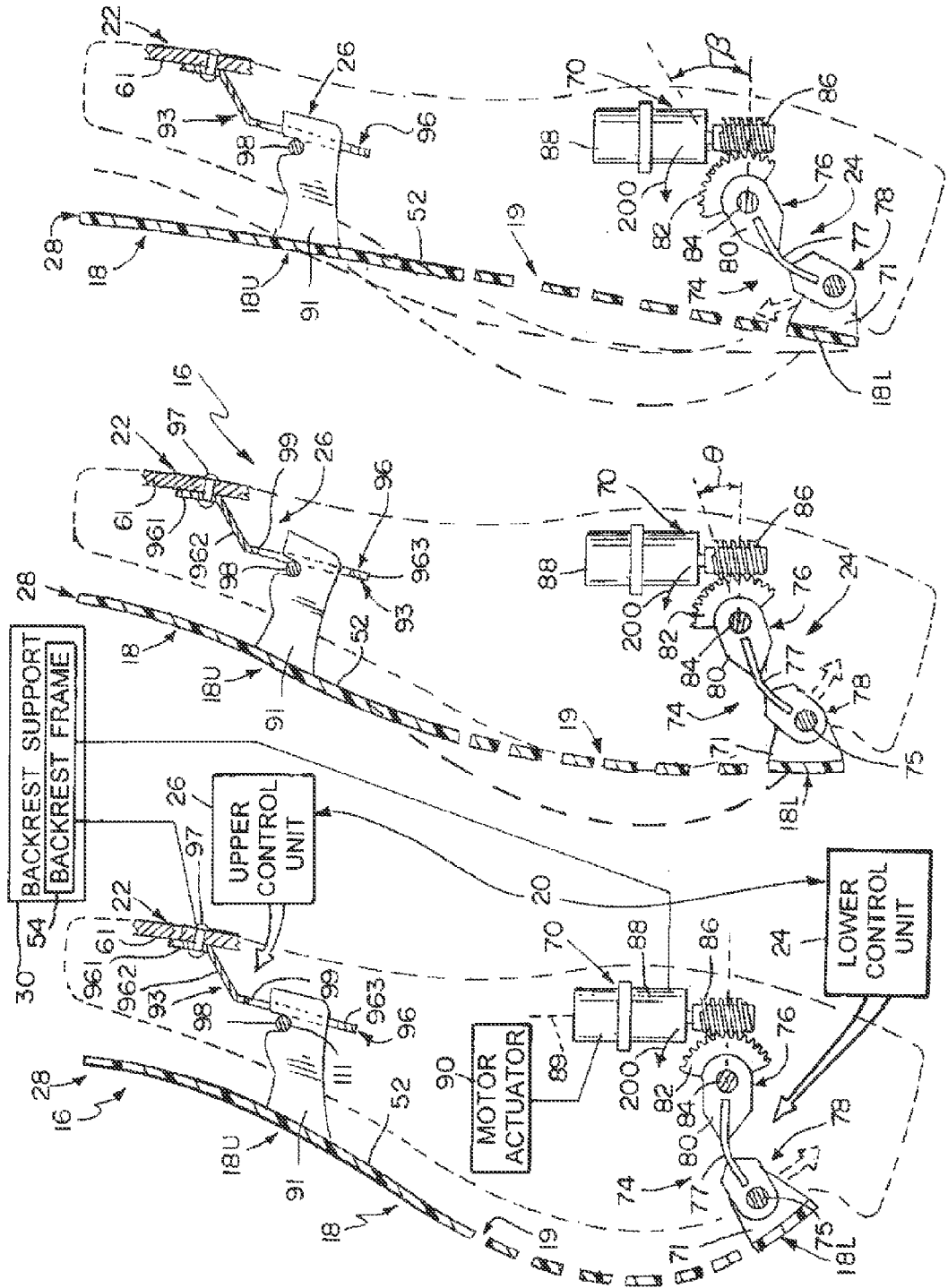

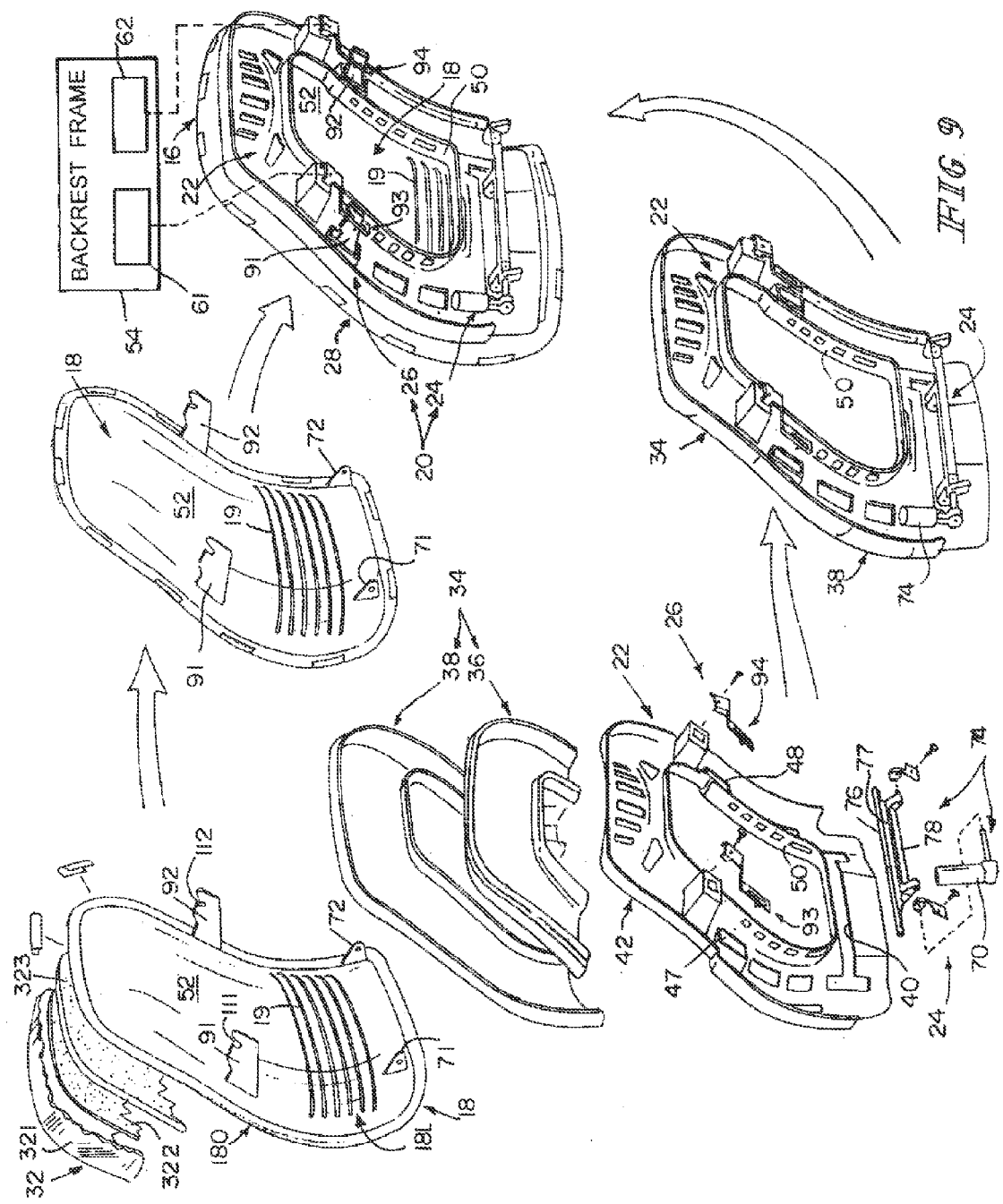

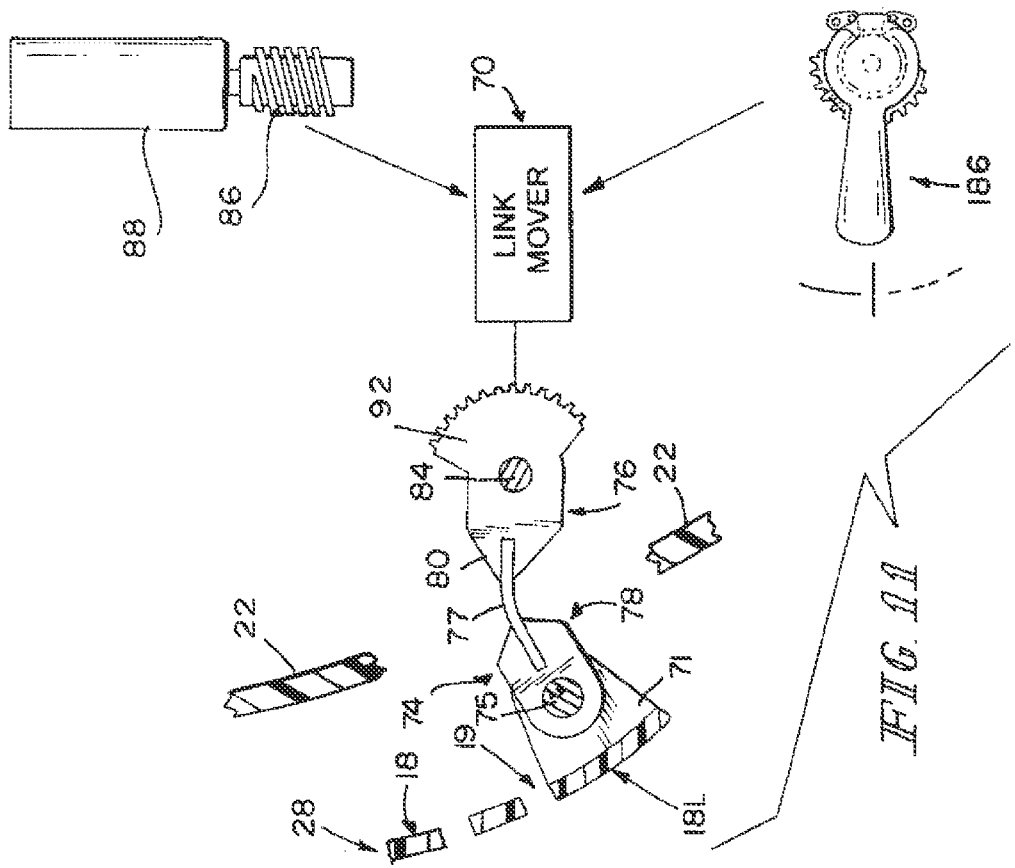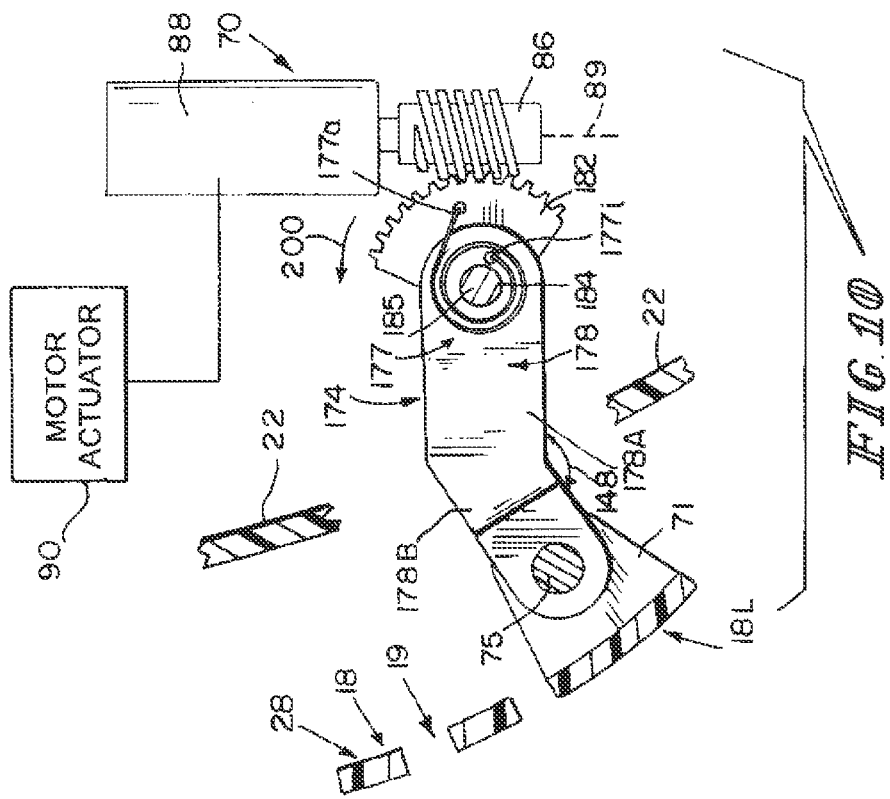

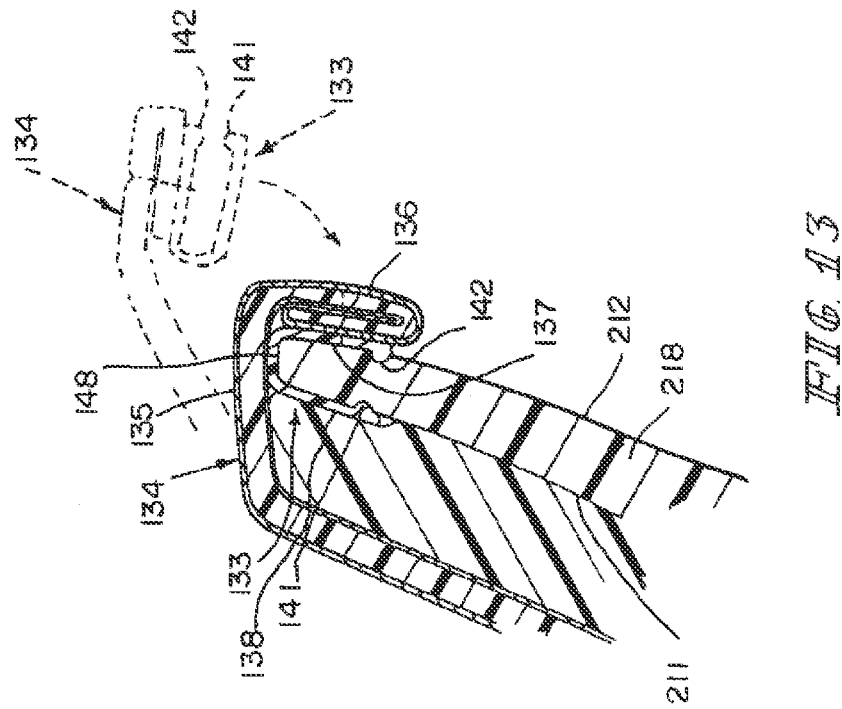
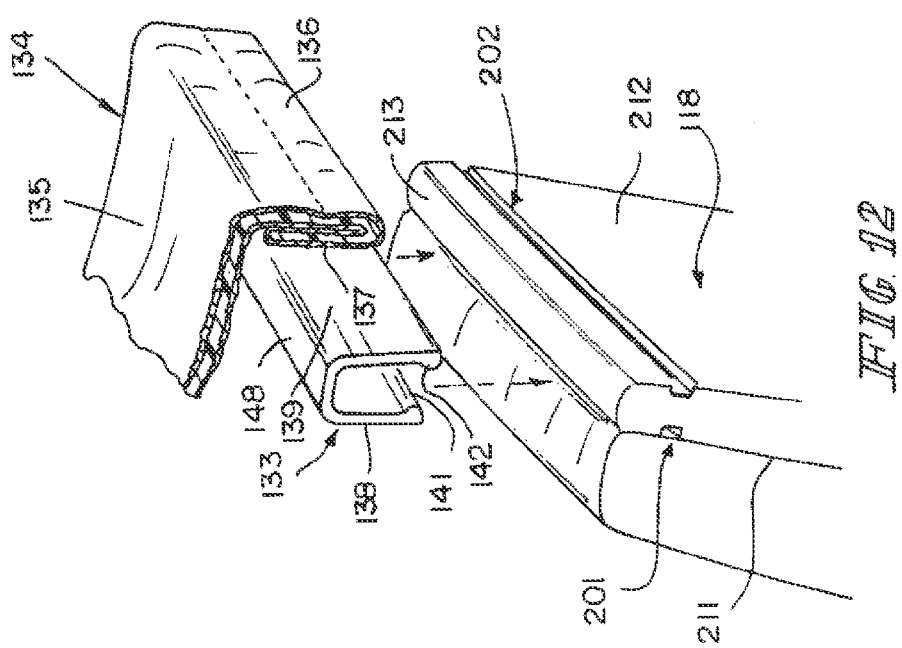

CONTROLLABLE COMFORT SHELL FOR VEHICLE SEAT

CROSS-REFERENCE TO RELATED APPLICATIONS

This application is a divisional of U.S. application Ser. No. 12/951,955, filed Nov. 22, 2010, now U.S. Pat. No. 8,857,908, which claim the priority of U.S. Provisional Application No. 61/263,642, filed Nov. 23, 2009. The complete contents of these earlier applications are hereby incorporated by reference.

BACKGROUND

The present disclosure relates to a vehicle seat, and particularly to a seat including an expandable and contractable portion. More particularly, the present disclosure relates to a vehicle seat including a seat back having a variable shape.

SUMMARY

According to the present disclosure, a vehicle seat includes a seat back. In illustrative embodiments, the vehicle seat also includes a seat bottom and the seat back extends upwardly from the seat bottom. The seat back includes a backrest support frame adapted to be coupled to a foundation mounted on a floor of a vehicle and a backrest in front of the backrest support frame.

In illustrative embodiments, the backrest includes a deformable back-support panel defined, for example, by a thin pliable contoured shell made of a pliable plastics material. Owing to its pliability, the deformable back-support panel is configured to deform and change shape in use to suit the size, shape, and spinal orientation of a passenger seated in the vehicle seat.

In illustrative embodiments, a panel-motion controller is configured to change the shape of the back-support panel under the command and control of a passenger seated in the seat. The panel-motion controller is located behind the deformable back-support panel.

An illustrative embodiments, the panel-motion controller includes a lower control unit including motor-driven means for changing the shape of the back-support panel to adjust the posture of the seated passenger. The lower control unit is responsive to commands of the seat passenger to operate a motor to move a shape-control link coupled to the back-support panel to cause the shape of the back-support panel to change to assume a selected shape.

In illustrative embodiments, the panel-motion controller includes lower and upper control units and each control unit includes a yieldable spring. Each of these units is configured to use those yieldable springs to provide passenger motion-driven means for passively changing the shape of the back-support panel in response to rearward movement of the seated passenger against the seat back. The springs in the lower and upper control units operate independently and in combination to change the shape of the deformable back-support panel (from the selected shape) temporarily to enhance posture support provided to the passenger in response to slouching, sinking, or other posture-changing movement of the seated passenger in the vehicle seat after the lower control unit has been used to establish a selected shape of the deformable back-support panel.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a vehicle seat including a seat bottom and a seat back with portions broken away to reveal a deformable back-support panel included in the seat back and arranged to lie under a seat cover included in the seat back and showing diagrammatically that the vehicle seat further includes a back-support panel-motion controller comprising a lower control unit coupled to a lower portion of the back-support panel and configured to control panel motion actively as suggested in FIGS. 4-6 and passively as suggested in FIGS. 7 and 8 and an upper control unit coupled to an upper portion of the back-support panel and configured to control panel motion passively as suggested in FIGS. 7 and 8;

FIG. 2 is an enlarged perspective view of the seat back of FIG. 1 showing several horizontally extending slots formed in a lower portion of the back-support panel and showing portions of inner, middle, and outer sheets included in the fabric cover.

FIG. 3 is an exploded perspective assembly view of illustrative components included in the seat back showing (from left to right) a backrest comprising three sheets included in the seat cover, the deformable back-support panel, a ring-shaped panel carrier underlying a cushion including a U-shaped portion of a pad and a U-shaped portion of a pad cover, and a backrest support comprising a backrest frame and a rear frame cover, and showing that the back-support panel-motion controller includes components cooperating to form the lower control unit in a lower dotted-line box and components cooperating to form the upper control unit in an upper dotted-line box;

FIGS. 4-6 illustrate in sequence use of the passenger-controlled lower control unit in the back-support panel-motion controller to deform and otherwise change the shape of the back-support panel actively to establish a selected shape and therefore vary lumbar-support characteristics of the back-support panel to suit the passenger seated in the vehicle seat;

FIG. 4 is an enlarged sectional view taken along line 4-4 of FIG. 2 showing the back-support panel in an initial position characterized by a fully bowed convex shape and showing illustrative components included in the lower and upper control units wherein the lower control unit includes a motorized gear system comprising a worm drive defined by a gear arrangement in which a worm (which is a gear in the form of a screw) meshes with a driven gear (which is similar in appearance to a spur gear);

FIG. 5 is a view similar to FIG. 4 showing the back-support panel after it has been moved actively by the lower control unit to assume an intermediate position characterized by a partly bowed convex shape;

FIG. 6 is a view similar to FIGS. 4 and 5 showing the back-support panel after it has been moved actively by the lower control unit to assume a final position characterized by a concave shape;

FIG. 7 shows that a relatively small force ($F_{SMALL}$) is applied by the lumbar region of a back of a passenger seated in the vehicle seat when the passenger is of a relatively small size and slouches in the vehicle seat to cause a small deflection of each of the yieldable springs included in the lower and upper control units so as to vary the shape of the actively positioned deformable back-support panel temporarily from the selected shape (shown in phantom lines) established by operation of the lower control unit to a new shape (shown in solid lines) to suit the size and shape of the slouching smaller passenger;

FIG. 8 shows that a relatively larger force ($F_{LARGE}$) is applied by the lumbar region of the back of a passenger seated in the vehicle seat when the passenger is of a relatively large size and slouches in the vehicle seat to cause a relatively larger deflection of the yieldable springs included in the lower and upper control units so as to vary the shape of the actively positioned deformable back-support panel temporarily from the selected shape (shown in phantom lines) established by operation of the lower control unit to a new shape (shown in solid lines) to suit the size and shape of the slouching larger passenger;

FIG. 9 shows various stages of assembly of components shown in FIG. 3 to produce the seat back shown in perspective in FIGS. 1 and 2 and in section in FIGS. 4-8;

FIG. 10 is an enlarged view of an illustrative lower control unit in accordance with another embodiment of the present disclosure;

FIG. 11 is a view similar to FIG. 10 showing a lower control unit in accordance with two embodiments of the present disclosure wherein a link mover meshing with the driven gear is either a worm or a ratchet;

FIG. 12 is a partial perspective assembly view of a seat back similar to the seat back shown in FIGS. 1 and 2 made in accordance with an alternative construction; and FIG. 13 is a sectional view of a portion of the seat back of FIG. 12 after the seat cover has been coupled to the back-support panel.

DETAILED DESCRIPTION

Figure 7:
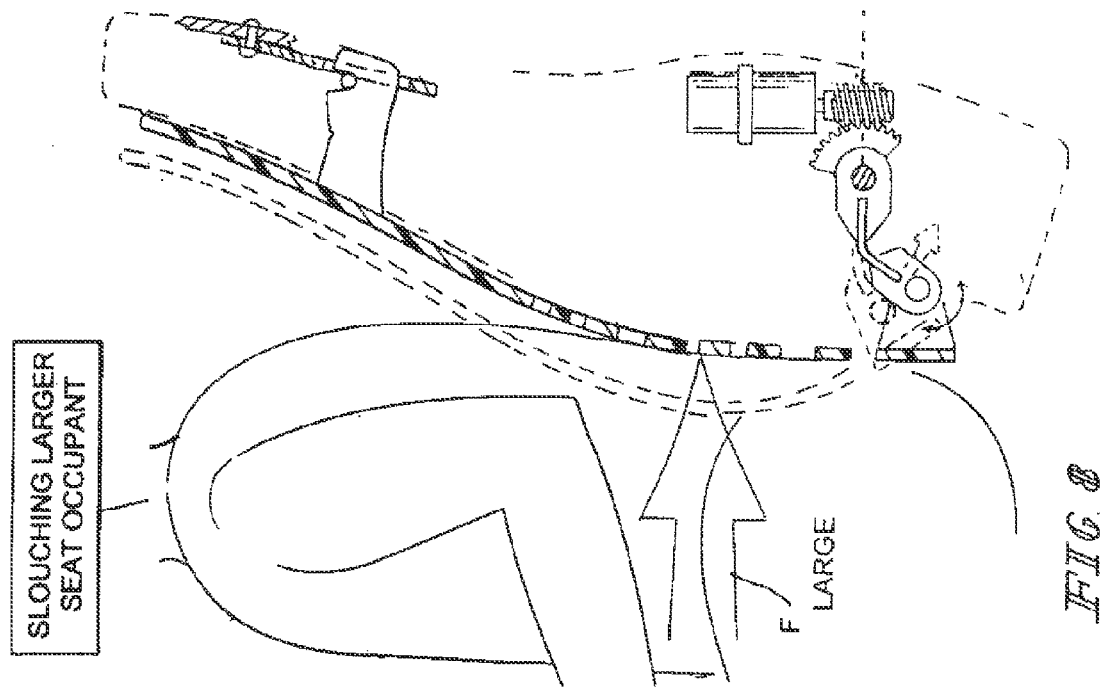
FIGS. 7 and 8 illustrate passive control of motion of the back-support panel governed by yieldable springs included in each of the lower and upper control units of the back-support panel-motion controller in response to application of movement-inducing forces applied to the deformable back-support panel by slouching smaller and larger passengers seated in the vehicle seat so that slouching or other movement of the passenger in the vehicle seat can change the shape of the deformable back-support panel temporarily without disabling or otherwise disrupting active control of back-support panel motion controller governed by a motorized gear system included in the lower control unit and operated by the passenger.

A vehicle seat 10 includes a foundation 12 adapted to be anchored to a vehicle floor 13, a seat bottom 14 mounted on foundation 12, and a seat back 16 arranged to extend upwardly from seat bottom 14 and configured to include a passenger-controlled deformable back-support panel 18 as shown, for example, in FIG. 1. A back-support panel-motion controller 20 associated with seat back 16 is also included in vehicle seat 10 and is shown diagrammatically in FIG. 1 and illustratively in FIG. 4.

Figure 8:
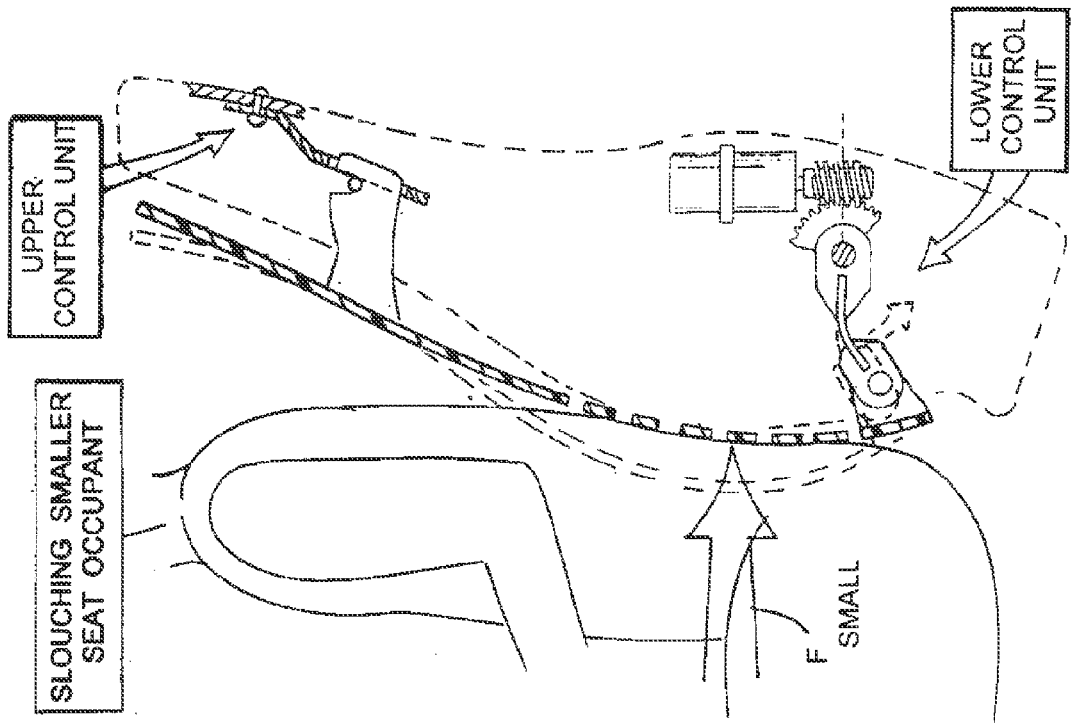

Panel-motion controller 20 is configured to provide means operable by a passenger 11 seated in vehicle seat 10 for actively controlling motion of the deformable back-support panel 18 included in seat back 16 as suggested in FIGS. 4-6 and for passively controlling motion of deformable back-support panel 18 as suggested in FIGS. 7 and 8. Using panel-motion controller 20, passenger 11 can change the shape of back-support panel 18 included in seat back 16 to provide a comfortable, customized, and sympathetic shape suited to the seated passenger 11.

Back-support panel 18 is arranged to extend along the back of a passenger 11S or 11L seated in vehicle seat 10 to provide lumbar and other spinal column support for such a passenger as shown, for example, in FIGS. 7 and 8. Back-support panel 18 is made of a deformable construction and has a shape that can be varied at the option of the passenger to provide custom spinal column support suited to the needs and commands of each passenger 11S or 11L as suggested in FIGS. 4-8. Back-support panel 18 is configured to bend and flex in a designed way to ensure proper pressure distribution and support through a wide range of seated postures. In illustrative embodiments, back-support panel 18 is movable relative to a panel carrier 22 that is arranged to lie behind back-support panel 18 and is also included in seat back 16 as shown, for example, in FIGS. 3 and 4. Back-support panel 18 is also movable relative to a backrest support 30 located behind panel carrier 22 as suggested in FIG. 3.

As suggested diagrammatically in FIG. 1, back-support panel-motion controller 20 includes a lower control unit 24 coupled to lower portion 18L of back-support panel 18 and an upper control unit 26 coupled to upper portion 18U of back-support panel 18. In illustrative embodiments, lower control unit 24 provides both active and passive control of the shape of back-support panel 18 while upper control unit 26 provides only passive control of the shape of back-support panel 10.

In an illustrative embodiment suggested in FIGS. 4-6, lower control unit 24 is configured to provide active-motion means for actively moving back-support panel 18 relative to panel carrier 22 and to backrest support 30 to cause the shape of back-support panel 18 to change to assume a selected shape so that lumbar support for a passenger 11 leaning against seat back 16 is varied to suit the seated passenger 11. Lower control unit 24 is also configured to provide lower passive-motion means for passively allowing shape-changing movement of back-support panel 18 relative to panel carrier 22 and to the backrest support 30 temporarily in response to rearwardly directed forces applied by the lumbar region of the back of a passenger 11 seated in vehicle seat 10 when the passenger 11 slouches or otherwise moves in a rearward direction as suggested in FIG. 7 in the case of a relatively smaller passenger 11S and as suggested in FIG. 8 in the case of a relatively larger passenger 11L.

In an illustrative embodiment suggested in FIGS. 4, 7, and 8, upper control unit 26 is configured to provide upper passive-motion means for passively allowing shape-changing movement of back-support panel 18 relative to panel carrier 22 and to backrest support 30 in response to rearwardly directed forces applied by a relatively smaller passenger 11S as suggested in FIG. 7 and a relatively larger passenger 11L as suggested in FIG. 8. Upper control unit 26 is separated from and operates independently of lower control unit 24.

Back-support panel 18 is defined by a thin pliable contoured comfort shell made of a pliable plastics material in an illustrative embodiment as suggested in FIGS. 3 and 4-8. Lower portion 18L of back-support panel 18 is formed to include a series of generally horizontally extending slots 19 in an illustrative embodiment shown in FIGS. 1-4. Slots 19 are formed to lie in vertically spaced-apart parallel relation to one another. Slots 19 are sized and shaped to facilitate controlled deformation of lower portion 18L of back-support panel 18 under the control of lower control unit 24 of panel-motion controller 20 as suggested in FIGS. 4-8. Owing to its pliability, upper portion 18U is also configured to deform and change shape (1) during motor-driven active movement of lower portion 18L under the control of lower control unit 24 as shown, for example, in FIGS. 4-6 and (2) during passenger-driven passive movement of lower portion 18L and/or upper portion 18U in response to application of rearward movement-inducing forces $F_{SMALL}$, $F_{LARGE}$ applied by seated passengers 11S, 11L to load a yieldable spring 77 included in lower control unit 24 and/or yieldable springs 96 included in upper control unit 26 as shown, for example, in FIGS. 7 and 8.

Seat back 16 includes a backrest 28 and a backrest support 30 in the illustrative embodiment shown, for example, in FIGS. 1-3. In an illustrative embodiment, back-support panel-motion controller 20 is coupled to backrest 28 and backrest support 30 as suggested in FIGS. 3 and 9 so that panel-motion controller 20 is arranged to control active and passive motion of back-support panel 18 as suggested in FIGS. 4-6, 7, and 8.

Backrest 28 includes a seat cover 32, deformable back-support panel 18, panel carrier 22, and a cushion 34 comprising a pad 36 and a pad cover 38 as shown, for example, in FIG. 3. Panel carrier 22 is ring-shaped in the illustrated embodiment and arranged to lie behind back-support panel 18 as suggested in FIG. 3. Pad 36 is sized to fit into a pad-receiving space 40 formed in an upper portion 42 of panel carrier 22 as also suggested in FIG. 3. Pad cover 38 is configured to cover pad 36 and portions of panel carrier 22 and be coupled to panel carrier 22 as suggested in FIGS. 3 and 9.

Seat cover 32 includes first, second, and third sheets 321, 322, and 323 as suggested in FIGS. 2 and 3 in an illustrative embodiment. First sheet 321 is a trim cover. Second sheet 322 is a foam backer. Third sheet 323 is a cushion foam pad. Any suitable means may be used to couple seat cover 32 to deformable back-support panel 18. One example of a seat cover coupling is illustrated in FIGS. 12 and 13.

Panel carrier 22 includes a lower portion 44 formed to include an H-shaped elongated lower-controller mount slot 46 and first and second upper-controller mount slots 47, 48 as suggested in FIG. 3. Portions of lower control unit 24 are arranged to extend through H-shaped elongated lower-controller mount slot 46 when panel-motion controller 20 is coupled to backrest support 30 as suggested in FIG. 3. Portions of upper control unit 26 are arranged to extend through each of first and second upper-controller mount slots 47, 48 when panel-motion controller 20 is coupled to backrest support 30 as also suggested in FIG. 3. Slots 47, 48 are arranged to lie between pad-receiving space 40 and slot 46 as shown, for example, in FIG. 3.

Panel carrier 22 is also formed to include a large central aperture 50 as suggested in FIG. 3. Deformable back-support panel 18 is arranged to cover a front side of central aperture 50 as suggested in FIGS. 3 and 9. When backrest 28 is assembled, a rearwardly facing surface 52 on back-support panel 18 is visible through central aperture 50 as suggested in FIG. 9.

Backrest support 30 includes a backrest frame 54 and a rear frame cover 56 in an illustrative embodiment as shown, for example, in FIG. 3. Backrest frame 54 is arranged to lie between panel carrier 22 and rear frame cover 56. Panel carrier 22 is coupled to backrest frame 54 to support backrest 28 in an anchored position on backrest support 30 and to allow movement of back-support panel 18 relative to backrest frame 54.

Backrest frame 54 is a rigid unit configured to be mounted on foundation 12 in a stationary position relative to vehicle floor 13 as suggested in FIGS. 1 and 9. Backrest frame 54 is formed to include a central aperture 60 as suggested in FIG. 3. Central aperture 60 is flanked by first and second upright mount strips 61, 62 as shown, for example, to FIG. 3. Upper control unit 26 is coupled to first and second upright mount strips 61, 62 as suggested in the illustrative embodiment shown in FIG. 3.

Rear frame cover 56 is configured to mount on and cover a rear side of backrest frame 54 as suggested in FIG. 3. Rear frame cover 56 includes a ring-shaped shield 64 formed to include a central aperture 66 and a ring-shaped wall 68 coupled to shield 64 along an interior perimeter edge thereof defining central aperture 66. Ring-shaped wall 68 is arranged to extend in a forward direction through central aperture 60 of backrest fame 54 and central aperture 50 of panel carrier 22 when rear frame cover 56 and panel carrier 22 are coupled to backrest frame 54 as suggested in FIG. 3. Rearwardly facing surface 52 of back-support panel 18 will be visible through central apertures 50, 60, and 66 as suggested in FIG. 3 when seat back 16 is assembled. It is within the scope of this disclosure to install a panel (not shown) in central aperture 66 to close that aperture for aesthetic reasons if desired. It is also within the scope of the present disclosure to mount a map pocket or a floating mesh pocket in central aperture 66 so as to be accessible to a passenger seated in a seat (not shown) located behind vehicle seat 10.

In an illustrative embodiment, lower control unit 24 of panel-motion controller 20 includes laterally spaced-apart first and second lower panel mount 71, 72, a link mover 70, and a shape-control link 74 coupled at one end to lower panel mounts 71, 72 and at another end to link mover 70 as suggested in FIGS. 3 and 4. Link mover 70 is configured to provide means for moving shape-control link 74 relative to panel carrier 22 and to backrest support 30 to cause movement of lower portion 18L of back-support panel 18 relative to panel carrier 22 and to backrest support 30 so that the shape of back-support panel 18 is changed to suit passenger 11 seated in vehicle seat 10 as shown, for example, in FIGS. 4-6. In an illustrative embodiment, link mover 70 is coupled to backrest frame 54 of backrest support 30 or to another suitable structure near backrest 28.

Lower panel mounts 71, 72 are coupled to rearwardly facing surface 52 of back-support panel 18 and arranged to lie in spaced-apart relation to one another and extend rearwardly toward backrest support 30 as suggested in FIGS. 3 and 9. In an illustrative embodiment, shape-control link 74 is arranged to extend through H-shaped elongated lower-controller mount slot 46 as suggested in FIG. 3, and one end of shape-control link 74 is coupled to each of first and second lower panel mounts 71, 72 as suggested in FIGS. 3 and 9.

Shape-control link 74 includes an input block 76 coupled to link mover 70, an output block 78 coupled to lower panel mount 71 (and lower panel mount 72) using an axle rod 75 sized to extend into apertures formed in lower panel mounts 71, 72 and into apertures formed in output block 78, and a yieldable spring 77 made of an elastic material and arranged to interconnect input block 76 and output block 78 as suggested in FIG. 4. An illustrative input block 76 comprises a clamp 80 coupled to one end of spring 77, a driven gear 82, and a pivot 84 coupled to clamp 80 and driven gear 82 to retain driven gear 82 in a fixed position relative to clamp 80. An illustrative output block 78 is shown in FIGS. 3 and 4 and is coupled to another end of spring 77. Spring 77 is a leaf spring in an illustrative embodiment as suggested in FIGS. 3 and 4. Shape-control link 74 also includes two mount brackets 73A, 73B as shown, for example, in FIG. 3, and these brackets 73A, 73B, are coupled to backrest frame 54. A shape-control link 174 comprising a clock spring 177 in accordance with another embodiment of the present disclosure is shown in FIG. 10.

An illustrative lower control unit 24 of the type shown in FIGS. 3-9 includes a motorized gear system comprises a worm drive defined by a gear arrangement in which a worm 86 (which is a gear in the form of a screw) meshes with a driven gear 82 (which is similar in appearance to a spur gear) is shown in FIG. 4. Link mover 70 includes a worm 86 configured to mate with driven gear 82, a motor 88 configured to provide means for rotating worm 86 about an axis of rotation 89, and a motor actuator 90 coupled to motor 88 and configured to actuate motor 88 at the command of passenger 11 in vehicle seat 10 in an illustrative embodiment shown, for example, in FIG. 4. Worm 86 is configured to mesh with teeth included in driven gear 82 so as to cooperate with driven gear 82 to establish a worm drive.

As suggested in FIGS. 4-6, rotation of worm 86 about axis rotation 89 moves driven gear 82 from a horizontal position shown, for example, in FIG. 4 through an angle θ of about 20° to assume a first inclined position shown, for example, in FIG. 5, and through an angle β of about 33° to assume a relatively steeper second inclined position shown, for example, in FIG. 6 so as to move shape-control link 74 to cause the shape of deformable back-support panel 18 to change. When driven gear 82 rotates in direction 200 about pivot rod 84, spring 77 is loaded to cause output block 78 to move to cause back-support panel 18 to change shape from a fully bowed convex shape as shown in FIG. 4 to an intermediate position characterized by a partly bowed convex shape, as shown in FIG. 5 and then to a final position characterized by a concave shape.

In an illustrative embodiment, upper control unit 26 of panel-motion controller 20 includes laterally spaced-apart first and second upper panel mounts 91, 92 and first and second shape-control links 93, 94 as shown, for example, in FIG. 3. Shape-control link 93 is coupled at one end to first upper panel mount 91 and at another end to panel carrier 22 and to backrest frame 54 of backrest support 30 as suggested in FIGS. 3 and 4. Similarly, shape-control link 94 is coupled at one end to second upper panel mount 92 and at another end to strip 92 of panel carrier 22 and to backrest frame 54 as suggested in FIG. 3.

Each of shape-control links 93, 94 includes a spring 96 comprising, in series, first segment 961, second segment 962 and third segment 963. Shape-control link 94 also includes a fastener 97 coupled to first segment 961 and to panel carrier 22 (and to backrest frame 54) to anchor spring 96 to panel carrier 22 (and to backrest frame 54) and allow movement of second and third segments 962, 963 relative to panel carrier 22 (and to backrest frame 54) as suggested in FIGS. 7 and 8. Each of shape-control links 93, 94 also includes a connector 98 coupled to a companion third segment 963 and arranged to straddle a slot 99 formed in that companion third segment 963 as suggested in FIG. 3.

First upper panel mount 91 is arranged to extend through first upper-controller mount slot 47 to mate with connector 98 included in a companion first shape-control link 93 of upper control unit 26 as suggested in FIGS. 3 and 4. A companion connector 98 extends into a notch 111 formed in first upper panel mount 91 while a free end of first upper panel mount 91 extends through slot 99 formed in third segment 963 of spring 96 of first shape-control link 93 as suggested in FIG. 4.

Similarly, second upper panel mount 92 is arranged to extend through second upper-controller mount slot 48 to mate with connector 98 included in a companion second shape-control link 94 of upper control unit 26 as suggested in FIG. 3. A companion connector 98 extends into a notch 112 formed in second upper panel mount 92 while a free end of second upper panel mount 92 extends through slot 99 formed in third segment 963 of spring 96 of second shape-control link 94 as suggested in FIG. 3.

A sequence of use of lower control unit 24 in back-support panel-motion controller 20 to deform and otherwise change the shape of back-support panel 18 actively to vary lumbar-support characteristics of back-support panel 18 to assume a selected shape to suit the passenger 11 seated in vehicle seat 10 is shown, for example, in FIGS. 4-6. Back-support panel 18 is shown, for example, in FIGS. 2 and 4 in an initial position characterized by a fully bowed convex shape. Back-support panel 18 is shown in FIG. 5 after it has been moved actively by lower control unit 24 to assume an intermediate position characterized by a partly bowed convex shape. Back-support panel 18 is shown in FIG. 6 after it has been moved actively by lower control unit 24 to assume a final position characterized by a concave shape.

Passive control of motion of back-support panel 18 governed by yieldable spring 77 in lower control unit 24 and by yieldable springs 96 included in upper control unit 26 of back-support panel-motion controller 20 in response to application of movement-inducing forces applied to deformable back-support panel 18 by slouching smaller and larger passengers 11S or 11L seated in vehicle seat 10. This spring-regulated system allows slouching or other movement of the passenger 11S or 11L in vehicle seat 10 to change temporarily the shape of deformable back-support panel 18 from the selected shape established by lower control unit 24 without disabling or otherwise disrupting active control of back-support panel motion controller 20 governed by a motorized gear system comprising driven gear 86, motor 88, and motor actuator 90 included in lower control unit 24 and operated by passenger 11S or 11L.

A relatively small force ($F_{SMALL}$) is applied by the lumbar region of a back of a passenger 11S seated in vehicle seat 10 when passenger 11S is of a relatively small size and slouches in vehicle seat 10 to cause a small deflection of each of springs 77, 96 included in lower and upper control units 24, 26 so as to vary the shape of the actively positioned deformable back-support panel 18 temporarily to suit the size and shape of the slouching smaller passenger 11S as suggested in FIG. 7. In contrast, a relatively larger force ($F_{LARGE}$) is applied by the lumbar region of the back of a passenger 11L seated in vehicle seat 10 when passenger 11L is of a relatively large size and slouches in vehicle seat 10 to cause a relatively larger deflection of springs 77, 96 included in lower and upper control units 24, 26 so as to vary passively the shape of the actively positioned deformable back-support panel 18 temporarily to suit the size and shape of the slouching larger passenger 11L as suggested in FIG. 8.

As suggested in FIG. 10, shape-control link 174 include an input block 182 (e.g., driven gear) coupled to link mover 70, an output block 178 coupled to lower panel mount 71 (and lower panel mount 72) using an axle rod 75 sized to extend into apertures formed in lower panel mounts 71, 72 and into apertures formed in output block 178, and a yieldable spring 177 arranged to interconnect input block 182 and output block 178. Spring 177 is a spiral clock spring in an illustrative embodiment as shown in FIG. 10. An inner end of 177i of clock spring 177 is coupled to output block 178, an outer end 177o of clock spring 177 is coupled to input block 182, and clock spring 177 is arranged to spiral around a central axis 185 established by pivot rod 184. In the illustrated embodiment, output block 178 is a bar that includes a first member 178A coupled to pivot rod 184 and a second member 178B coupled to axle rod 75 and arranged to define an obtuse included angle 148 of about 148 degrees therebetween as shown in FIG. 10. When input block 182 rotates in direction 200 about pivot rod 184, clock spring 177 is expanded to cause shape-control link 174 to move to cause back-support panel 18 to change shape from a fully bound convex shape as shown in FIG. 10 (see also FIG. 4) to assume a final position characterized by a concave shape (of the type shown, for example, in FIG. 6).

FIG. 11 is a view similar to FIG. 10 showing a lower control unit in accordance with two embodiments of the present disclosure wherein the link mover meshing with driven gear 82 is either a worm 86 or a ratchet 186. It is within the scope of the present disclosure to use my suitable means to rotate driven gear 82 about pivot rod 84 to load or unload a spring (e.g., 77 or 177) to cause back-support panel 18 to change shape.

A partial perspective assembly view of a seat back similar to the seat back shown in FIGS. 1 and 2 made in accordance with an alternative construction is shown in FIG. 12. A sectional view of a portion of the seat back of FIG. 12 after the seat cover has been coupled to the back-support panel is shown in FIG. 13.

A back-support panel 118 is formed to include two horizontally extending ridge-retainer grooves 201, 202 extending across the width of back-support panel 118 as shown in FIGS. 12 and 13. First ridge-retainer groove 201 provides an opening in a forwardly facing surface 211 of back-support panel 118. Second ridge-retainer groove 202 provides an opening in a rearwardly facing surface 212 of back-support panel 118. Each groove 201,202 is arranged to lie a predetermined distance below a laterally extending top surface 213 of back-support panel 118 as suggested in FIG. 12.

A portion of an illustrative seat cover 132 in accordance with another embodiment of the present disclosure includes a sheet 134 including first, second, and third panels 135, 136, 137 folded as suggested in FIG. 12 and a clamp 133 as also suggested in FIG. 12. Sheet 134 is coupled to clamp 133 as suggested in FIG. 13 and clamp 133 is adapted to mate with back-support panel 118 as suggested in FIGS. 12 and 13 to mount sheet 134 on back-support panel 118.

Clamp 133 includes first and second side walls 137, 139, a top wall interconnecting top edges of first and second side walls 137, 139, a first ridge 141 coupled to a lower edge of first side wall 137, and a second ridge 142 coupled to a lower edge of second side wall 139. First ridge 141 is configured to extend into first ridge-retainer groove 201 and second ridge 142 is arranged to extend toward first ridge 141 and into second ridge-retainer groove 202 to anchor clamp 138 to back-support panel 118 as suggested in FIG. 13. Panels 136, 137 of sheet 134 are folded to form a strip that is coupled to second side wall 139 of clamp 133 using any suitable means.

Panel-motion controller 20 provides means for controlling a comfort shell defined by back-support panel 18 included in an automotive seat structure such as vehicle seat 10. Back-support panel 18 is a molded plastic seat pan with a sympathetic shape to the occupant of vehicle seat 10. Back-support panel 18 is configured to bend and flex in a designed way to ensure proper pressure distribution and support through a wide range of seated postures.

The shape of the comfort shell established by back-support panel 18 is controlled in part by lower control unit 24 located behind back-support panel 18 and coupled to rearwardly facing surface 52 of back-support panel 18 and to backrest support 30. Such shape is also controlled in part by upper control unit 26 also located behind back-support panel 18 and coupled to rearwardly facing surface 52 of back-support panel 18 and to backrest support 30. Each unit 24, 26 includes either a spring extending across the width of back-support panel 18 or independent left and right springs. In the present disclosure, in illustrative embodiments, lower and upper control units 24, 26 are located behind back-support panel 18, i.e., between back-support panel 18 and backrest support 30 in a manner suited for use in a vehicle seat so as not to expand the dimensions of the vehicle seat and to function without impeding ingress/egress. Upper control unit 26 is configured to combine with back-support panel 18 to provide upper back performance to satisfy dynamic driving conditions associated with vehicles.

A spinal column of a passenger 11 includes (from top to bottom in series) cervical, thoracic, lumbar, sacral, and coccyx regions. When viewed laterally (i.e., from the side), the lumbar region of the spine is characterized normally by a lordotic curve described as convex anteriorly and concave posteriorly. However, if a passenger slouches in a vehicle seat, the spine could shift so as to be characterized by a kyphotic curve described as concave anteriorly and convex posteriorly.

Back-support panel 18 and panel-motion controller 20 are configured in accordance with the present disclosure to vary the shape of back-support panel 18 in one or both of active and reactive (passive) modes of operation under the command and control of a seated passenger 11. Back-support panel 18 is varied in shape owing in part to passenger motion-driven deflection of elastic yieldable springs 77, 96 in lower and upper control units 24, 26 of panel-motion controller 20 to provide customized upper back deflection (sinking feeling) to suit the needs of a slouching passenger large or small (11L or 11S) as suggested in FIGS. 7 and 8. Back-support panel 18 is also varied in shape owing in part to motor-driven movement of link 74 in lower control unit 24 to provide posture adjustment (lordosis to kyphosis) to suit the needs of a passenger 11 seated in vehicle seat 10 as suggested in FIGS. 4-6. Each of these shape-varying inputs can occur in isolation or combination and cooperate in an additive manner to vary the shape of back-support panel 18 to suit the needs of passenger 11.

Deformable back-support panel 18 is configured to bend and flex to move relative to backrest support 30 to assume many different shapes to provide custom spinal column support to a passenger seated in vehicle seat 10 adjacent to deformable back-support panel 18. Back-support panel-motion controller 20 is coupled to deformable back-support panel 18. Back-support panel-motion controller 20 is configured to provide means (operable by a passenger seated in vehicle seat 10) for moving deformable back-support panel 18 relative to backrest support 30 in an initial stage of active operation to assume a selected shape in response to activation of an actuator included in back-support panel-motion controller 20 and for independently allowing the selected shape of deformable back-support panel 18 to vary passively after assumption of the selected shape in a subsequent stage of passive operation without activating the actuator in response to forces applied by a torso of a seated passenger leaning against deformable back-support panel 18 as the seated passenger shifts position relative to seat back 16 to assume a new posture in vehicle seat 10.

Deformable back-support panel 18 includes an upper portion 18U arranged to lie in spaced-apart relation to seat bottom 14 and a lower portion 18L arranged to lie between seat bottom 14 and upper portion 180. Back-support panel-motion controller 20 includes a lower control unit 24 coupled to lower portion 18L of deformable back-support panel 18 and configured to provide active-motion means for actively moving deformable back-support panel 18 relative to backrest support 30 to cause the shape of deformable back-support panel 18 to change to assume the selected shape so that lumbar support for a seated passenger leaning against seat back 16 is varied to suit the passenger and to provide lower passive-motion means for passively allowing shape-changing movement of deformable back-support panel 18 temporarily away from the selected shape and relative to backrest support 30 in response to rearwardly directed forces applied by a sealed passenger during a shift in position of the seated passenger on seat bottom 14 and relative to seat back 16 to assume a new posture in vehicle seat 10.

Lower control unit 24 includes a lower panel mount 71 coupled to lower portion 18L of deformable back-support panel 18, a link mover 70 separated from deformable back-support panel 18, and a shape-control link (74 or 174) arranged to interconnect lower panel mount 72 and link mover 70. Link mover 70 is configured to provide means for actively moving the shape-control link (74 or 174) relative to backrest support 30 to cause movement of lower portion 18L of deformable back-support panel 18 relative to backrest support 30 so that the shape of deformable back-support panel 18 is varied to assume the selected shape to suit the seated passenger.

Shape-control link 74 (or 174) comprises a yieldable spring 77 (or 177) made of an elastic material. The shape-control link is configured to yield elastically when deformable back-support panel 18 has assumed the selected shape during exposure of deformable back-support panel 18 to rearwardly directed forces applied by the seated passenger during a change in posture of the seated passenger to allow deformable back-support panel 18 to assume temporarily a changed shape only as long as the rearwardly directed forces are applied to deformable back-support panel 18 by the seated passenger.

Back-support panel-motion controller 20 further includes an upper control unit 26 coupled to upper portion 18U of deformable block-support panel 18. Upper control unit 26 is configured to provide passive-motion means for passively allowing shape-changing movement of deformable back-support panel 18 relative to backrest support 30 temporarily in response to rearwardly directed forces applied by a lumbar region of a back of a seated passenger when the person slouches to move in a rearward direction toward deformable back-support panel 18.

Upper control unit 26 includes an upper panel mount 91 coupled to upper portion 18U of deformable back-support panel 18 and a shape-control link 93 coupled to upper panel mount 91. Shape-control link 93 is configured to include a yieldable spring 96 made of an elastic material and configured to yield elastically in response to application of movement-inducing forces applied to deformable back-support panel 18 by a seated passenger during a change in posture of the seated passenger.

Seat back 16 further includes a panel carrier 22 interposed between deformable back-support panel 18 and backrest support 30 and formed to include an opening. A lower portion of back-support panel-motion controller 20 is arranged to interconnect backrest support 30 and deformable back-support panel 18 and extend through the opening formed in panel carrier 22 and an upper portion of back-support panel-motion controller 20 is arranged to interconnect deformable back-support panel 18 and panel carrier 22.

Upper portion of back-support panel-motion controller 20 is coupled to upper portion 18U of deformable back-support panel 18. Lower portion of back-support panel-motion controller 20 is coupled to the lower portion of deformable back-support panel 20.

In an illustrative embodiment, a vehicle seat 10 includes a seat back 16 and a back-support panel-motion controller 20. Seat back 16 includes a backrest support 30 and a backrest 28. Backrest 28 illustratively includes a deformable back-support panel 18 configured to bend and flex to move relative to backrest support 30 to assume many different shapes to provide custom spinal column support to a passenger 11 seated in vehicle seat 10 adjacent to deformable back-support panel 18.

Back-support panel-motion controller 20 is coupled to deformable back-support panel 18. Back-support panel-motion controller 20 is configured to provide means operable by passenger 11 seated in vehicle seat 10 for moving deformable back-support panel 18 relative to backrest support 30 in an initial stage of active operation to assume a selected shape in response to activation of an actuator included in back-support panel-motion controller 20. Back-support panel-motion controller 20 is also configured to provide means for independently allowing the selected shape of deformable back-support panel 18 to vary passively after assumption of the selected shape in a subsequent stage of passive operation without activating the actuator in response to forces applied by a torso of a seated passenger leaning against deformable back-support panel 18 as seated passenger 11 shifts position relative to seat back 16 to assume a new posture in vehicle seat 10.

Vehicle seat further includes a seat bottom 14 that is adapted to lie under and support seated passenger 11. Seat back 16 is arranged to extend upwardly from seat bottom 14. Deformable back-support panel 18 includes an upper portion 18U and a lower portion 18L. Upper portion 18U is arranged to lie in spaced-apart relation to seat bottom 14. Lower portion 18L is arranged to lie between seat bottom 14 and upper portion 18U. Back-support panel-motion controller 20 includes a lower control unit 24 coupled to lower portion 18L of deformable back-support panel 18 and is configured to provide active-motion means for actively moving deformable back-support panel 18 relative to backrest support 30 to cause the shape of deformable back-support panel 18 to change to assume the selected shape so that lumbar support for seated passenger 11 leaning against seat back 16 is varied to suit passenger 11. Lower control unit 24 is configured to provide lower passive-motion means for passively allowing shape-changing movement of deformable back-support panel 18 temporarily away from the selected shape and relative to backrest support 30 in response to rearwardly directed forces applied by seated passenger 11 during a shift in position of seated passenger 11 on seat bottom 14 and relative to seat back 16 to assume a new posture in vehicle seat 10.

Lower control unit 24 illustratively includes a lower panel mount 71, a link mover 70, and a shape-control link 74. Lower control unit 24 is coupled to lower portion 18L of the deformable back-support panel 18. Link mover 70 is separated from deformable back-support panel 18. Shape-control link 74 is arranged to interconnect lower panel mouth 71 and link mover 70. Link mover 70 is configured to provide means for actively moving shape-control link 74 relative to backrest support 30 to cause movement of lower portion 18L of deformable back-support panel 18 relative to backrest support 30 so that the shape of deformable back-support panel 18 is varied to assume the selected shape to suit seated passenger 11.

As an example, shape-control link 74 includes a yieldable spring 77 made of an elastic material. Yieldable spring 77 is configured to yield elastically when deformable back-support panel 18 has assumed the selected shape during exposure of deformable back-support panel 18 to rearwardly directed forces applied by seated passenger 11 during a change in posture of seated passenger 11 to allow deformable back-support panel 18 to assume temporarily a changed shape only as long as the rearwardly directed forces are applied to deformable back-support panel 18 by seated passenger 11.

Shape-control link 74 further comprises an input block 182, an output block 78, and yieldable spring 77. Input block 182 is coupled to link mover 70. Output block 78 is coupled to lower panel mount 71 using an axle rod 75. Yieldable spring 77 is made of an elastic material and is arranged to interconnect input and output blocks 182, 78.

Input block 182 comprises a driven gear 82 and a pivot rod 84 coupled to driven gear 82 to support driven gear 82 for rotation about a pivot axis. Output block 78 is coupled to another end of yieldable spring 77 and link mover 70 is arranged to engage driven gear 82 and rotate about an axis to rotate driven gear 82 about a pivot axis to cause shape-control link 74 to move relative to backrest support 30.

Input block 182 further comprises a clamp 80 coupled to one end of the yieldable spring 77. Pivot rod 84 also is coupled to clamp 80. In one embodiment, yieldable spring 77 is a leaf spring.

In another illustrative embodiment, yieldable spring 177 is a spiral clock spring. An inner end of spiral clock spring 177 is coupled to output block 78. An outer end of spiral clock spring 177 is coupled to input block 182. Spiral clock spring 177 is arranged to spiral around a central axis 185 established by pivot rod 184.

As shown in FIG. 10, another embodiment of an output block 178 is a bar that includes a first member 178A and a second member 178B. First member 178A is coupled to pivot rod 184 and second member 178B is coupled to axle rod 75 and is arranged to define an obtuse included angle 148 therebetween.

In one illustrative embodiment, link mover 70 includes a worm 86, a motor 88, and a motor actuator 90. Worm 86 is configured to mate with driven gear 82 to establish a worm drive and to rotate driven gear 82 about pivot axis 89 to load or unload yieldable spring 177 to cause deformable back-support panel 18 to change shape. Motor 88 is configured to provide means for rotating worm 86 about an axis 89 of rotation. Motor actuator 90 is coupled to motor 88 and is configured to actuate motor 88 at the command of seated passenger 11.

In another illustrative embodiment, link mover 70 includes a ratchet 186 mounted for rotation about an axis of rotation. Ratchet 186 includes teeth mating with driven gear 82 and a handle configured to provide means for moving the teeth about the pivot axis to turn driven gear 82 about the pivot axis to load or unload yieldable spring 177 to cause deformable back-support panel 18 to change shape.

Back-support panel-motion controller 20 further includes an upper control unit 26 coupled to upper portion 18U of deformable block-support portion 18. Back-support panel-motion controller 20 is configured to provide passive-motion means for passively allowing shape-changing movement of deformable back-support panel 18 relative to backrest support 30 temporarily in response to rearwardly directed forces applied by a lumber region of a back of seated passenger 11 when seated passenger 11 slouches to move in a rearward direction toward deformable back-support panel 18.

Upper control unit 26 includes an upper panel mount 92 and a shape-control link 94. Upper panel mount 92 is coupled to upper portion 18U of deformable back-support panel 18. Shape-control link 94 is coupled to upper panel mount 92 and is configured to include a yieldable spring 96 made of an elastic material and configured to yield elastically in response to application of movement-inducing forces applied to deformable back-support panel 18 by seated passenger 11 during a change in posture of seated passenger 11.

Seat back 16 further includes a panel carrier 22 interposed between deformable back-support panel 18 and backrest support 30. Panel carrier 22 is formed to include an opening 50. A lower portion of back-support panel-motion controller 20 is arranged to interconnect backrest support 30 and deformable back-support panel 18 and extend through opening 50 formed in panel carrier 22. An upper portion of back-support panel-motion controller 20 is arranged to interconnect deformable back-support panel 18 and the panel carrier 22.

Vehicle seat 10 further includes seat bottom 14 adapted to lie under and support seated passenger 11. Seat 10 is arranged to extend upwardly from seat bottom 14. Deformable back-support panel 18 includes upper portion 18U and lower portion 18L. Upper portion 18U is arranged to lie in spaced-apart relation to seat bottom 14. Lower portion 18L is arranged to lie between seat bottom 14 and upper portion 18U. Upper portion 18U of back-support panel-motion controller 20 is coupled to upper portion 18U of deformable back-support panel 18 and lower portion 18L of back-support panel-motion controller 20 is coupled to lower portion 18L of deformable back-support panel 18.

In another embodiment, a vehicle seat 10 includes a seat between 14, a seat back 16, and a back-support panel-motion controller 20. Seat back 16 extends upwardly form seat bottom 14 and includes a deformable back-support panel 18 having an initial shape and including an upper portion 18U arranged to lie in spaced-apart relation to seat bottom 14 and a lower portion 18L arranged to lie between seat bottom 14 and upper portion 18U. Back-support panel-motion controller 20 is configured to change the shape of deformable back-support panel 18 under the command and control of a seated passenger 11 seated on seat bottom 14.

Back-support panel-motion controller 20 includes a lower control unit 24 including active-motion means coupled to lower portion 18L of deformable back-support panel 18 for actively changing the shape of deformable back-support panel 18 to assume a selected shape different from the initial shape to adjust the posture of seated passenger 11. The active-motion means includes a yieldable spring 77 made of an elastic material and is configured to yield elastically when deformable back-support panel 18 has assumed the selected shape during exposure of deformable back-support panel 18 to rearwardly directed forces applied by seated passenger 11 during a change in posture of seated passenger 11 to allow deformable back-support panel 18 to assume temporarily a changed shape only as long as the rearwardly directed forces are applied to deformable back-support panel 18 by seated passenger 11.

Back-support panel-motion controller 20 further includes an upper control unit 26 that includes passive-motion means coupled to upper portion 18U of deformable back-support panel 18 for passively allowing shape-changing movement of deformable back-support panel 18 to assume a temporary shape different from the selected shape in response to rearwardly directed forces applied by a lumbar region of a back of seated passenger 11 when seated passenger 11 slouches to move in a rearward direction relative to seat bottom 14 and toward deformable back-support panel 18. The passive-motion means in upper control unit 26 includes a yieldable spring 96 made of an elastic material and configured to yield elastically when deformable back-support panel 18 has assumed the selected shape during exposure of deformable back-support panel 18 to rearwardly directed forces applied by seated passenger 11 during a change in posture of seated passenger 11 to allow deformable back-support panel 18 to assume temporarily a changed shape only as long as the rearwardly directed forces are applied to deformable back-support panel 18 by seated passenger 11.

Yieldable springs 77, 96 included in the lower and upper control units 24, 26 are separated from one another to deform elastically independent of one another. Yieldable springs 77, 96 enhance posture support provided to seated passenger 11 even when seated passenger 11 slouches or sinks in vehicle seat 10 without disrupting operation of the active-motion means to establish the selected shape of deformable back-support panel 18.

Lower control unit 24 includes a lower panel mount 71, a link mover 70, and a shape control link 74. Lower panel mount 71 is coupled to lower portion 18L of deformable back-support panel 18. Link mover 70 is separated from deformable back-support panel 18. Shape-control link 74 is arranged to interconnect lower panel mount 71 and link mover 70. Link mover 70 is configured to provide means for actively moving shape-control link 74 relative to backrest support 30 to cause movement of lower portion 18L of deformable back-support panel 18 relative to backrest support 30 so that the shape of deformable back-support panel 18 is varied to assume the selected shape to suit seated passenger 11.

Shape-control link 74 illustratively comprises an input block 182, an output block 78, and a yieldable spring 77. Input block 182 is coupled to link mover 70. Output block 78 is coupled to lower panel mount 71 using an axle rod 75. Yieldable spring 77 is made of an elastic material and is arranged to interconnect input and output blocks 182, 78.

The invention claimed is:

1. A vehicle seat comprising
a seat back including a backrest support and a backrest, the backrest including a deformable back-support panel configured to bend and flex to move relative to the backrest support to assume many different shapes to provide custom spinal column support to a seated passenger seated in the vehicle seat adjacent to the deformable back-support panel,
a back-support panel-motion controller coupled to the deformable back-support panel and configured to provide means operable by the seated passenger for moving the deformable back-support panel relative to the backrest support in an initial stage of active operation to assume a selected shape in response to activation of an actuator included in the back-support panel-motion controller and for independently allowing the selected shape of the deformable back-support panel to vary passively after assumption of the selected shape in a subsequent stage of passive operation without activating the actuator in response to forces applied by a torso of the seated passenger leaning against the deformable back-support panel as the seated passenger shifts position relative to the seat back to assume a new posture in the vehicle seat,
a seat bottom adapted to lie under and support the seated passenger, wherein the seat back is arranged to extend upwardly from the seat bottom, the deformable back-support panel includes an upper portion arranged to lie in spaced-apart relation to the seat bottom and a lower portion arranged to lie between the seat bottom and the upper portion, and the back-support panel-motion controller includes a lower control unit coupled to the lower portion of the deformable back-support panel and configured to provide active-motion means for actively moving the deformable back-support panel relative to the backrest support to cause the shape of the deformable back-support panel to change to assume the selected shape so that lumbar support for the seated passenger leaning against the seat back is varied to suit the passenger and to provide lower passive-motion means for passively allowing shape-changing movement of the deformable back-support panel temporarily away from the selected shape and relative to the backrest support in response to rearwardly directed forces applied by the seated passenger during a shift in position of the seated passenger on the seat bottom and relative to the seat back,
wherein the lower control unit includes a lower panel mount coupled to the lower portion of the deformable back-support panel, a link mover separated from the deformable back-support panel, and a shape-control link arranged to interconnect the lower panel mount and the link mover, and wherein the link mover is configured to provide means for actively moving the shape-control link relative to the backrest support to cause movement of the lower portion of the deformable back-support panel relative to the backrest support so that the shape of the deformable back-support panel is varied to assume the selected shape to suit the seated passenger,
wherein the shape-control link comprises an input block coupled to the link mover, an output block coupled to the lower panel mount using an axle rod, and a yieldable spring made of an elastic material and arranged to interconnect the input and output blocks,
wherein the input block comprises a driven gear and a pivot rod coupled to the driven gear to support the driven gear for rotation about a pivot axis, the output block is coupled to another end of the yieldable spring, and the link mover is arranged to engage the driven gear and rotate about an axis to rotate the driven gear about the pivot axis to cause the shape-control link to move relative to the backrest support; and
wherein the yieldable spring is a spiral clock spring, an inner end of the spiral clock spring is coupled to the output block, an outer end of the spiral clock spring is coupled to the input block, and the spiral clock spring is arranged to spiral around a central axis established by the pivot rod.

2. The vehicle seat of claim 1, wherein the yieldable spring of the shape-control link is configured to yield elastically when the deformable back-support panel has assumed the selected shape during exposure of the deformable back-support panel to rearwardly directed forces applied by the seated passenger during a change in posture of the seated passenger to allow the deformable back-support panel to assume temporarily a changed shape only as long as the rearwardly directed forces are applied to the deformable back-support panel by the seated passenger.

3. The vehicle seat of claim 1, wherein the output block is a bar that includes a first member coupled to the pivot rod and a second member coupled to the axle rod and arranged to define an obtuse included angle between the first member and the second member.

4. The vehicle seat of claim 1, wherein the link mover includes a worm configured to mate with the driven gear to establish a worm drive and to rotate the driven gear about the pivot axis to load or unload the yieldable spring to cause the deformable back-support panel to change shape, a motor configured to provide means for rotating the worm about an axis of rotation, and a motor actuator coupled to the motor and configured to actuate the motor at the command of the seated passenger.

5. The vehicle seat of claim 1, wherein the link mover includes a ratchet mounted for rotation about an axis of rotation and the ratchet includes teeth mating with the driven gear and a handle configured to provide means for moving the teeth about the axis of rotation to turn the driven gear about the pivot axis to load or unload the yieldable spring to cause the deformable back-support panel to change shape.

6. The vehicle seat of claim 1, wherein the back-support panel-motion controller further includes an upper control unit coupled to the upper portion of the deformable back-support panel and configured to provide passive-motion means for passively allowing shape-changing movement of the deformable back-support panel relative to the backrest support temporarily in response to rearwardly directed forces applied by a lumbar region of a back of the seated passenger when the seated passenger slouches to move in a rearward direction toward the deformable back-support panel.

7. The vehicle seat of claim 6, wherein the upper control unit includes an upper panel mount coupled to the upper portion of the deformable back-support panel and a shape-control link coupled to the upper panel mount and configured to include a yieldable spring made of an elastic material and configured to yield elastically in response to application of movement-inducing forces applied to the deformable back-support panel by the seated passenger during a change in posture of the seated passenger.

8. The vehicle seat of claim 1, wherein the seat back further includes a panel carrier interposed between the deformable back-support panel and the backrest support and formed to include an opening, a lower portion of the back-support panel-motion controller is arranged to interconnect the backrest support and the deformable back-support panel and extend through the opening formed in the panel carrier, and an upper control unit of the back-support panel-motion controller is arranged to interconnect the deformable back-support panel and the panel carrier.

9. The vehicle seat of claim 8, wherein the upper control unit of the back-support panel-motion controller is coupled to the upper portion of the deformable back-support panel.

\* \* \* \* \*